US012196276B2

(12) United States Patent
Kurematsu

(10) Patent No.: US 12,196,276 B2
(45) Date of Patent: Jan. 14, 2025

(54) SELECTABLE CLUTCH

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO, Osaka (JP)

( * ) Notice: Subject to any disclaimer, the term of this patent is extended or adjusted under 35 U.S.C. 154(b) by 0 days.

(21) Appl. No.: 18/629,186

(22) Filed: Apr. 8, 2024

(65) Prior Publication Data

US 2024/0392844 A1    Nov. 28, 2024

(30) Foreign Application Priority Data

May 23, 2023    (JP) .................................. 2023-084344

(51) Int. Cl.
*F16D 41/067*    (2006.01)
(52) U.S. Cl.
CPC .................................. *F16D 41/067* (2013.01)
(58) Field of Classification Search
CPC ........... F16D 41/067; F16D 2041/0665; F16D 2023/123
See application file for complete search history.

(56) References Cited

U.S. PATENT DOCUMENTS

| | | | |
|---|---|---|---|
| 8,162,114 B2 * | 4/2012 | Shirataki | F16D 41/067 192/45.017 |
| 10,337,570 B2 * | 7/2019 | Tsukamoto | F16D 41/105 |
| 2021/0071722 A1 * | 3/2021 | Sato | F16C 35/077 |

FOREIGN PATENT DOCUMENTS

| | | |
|---|---|---|
| JP | 2021-102980 A | 7/2021 |
| JP | 2021-156432 A | 10/2021 |
| JP | 2022-38806 A | 3/2022 |
| JP | 2022-47794 A | 3/2022 |
| JP | 2022-165688 A | 11/2022 |

* cited by examiner

*Primary Examiner* — Huan Le
(74) *Attorney, Agent, or Firm* — WHDA, LLP

(57) ABSTRACT

A selectable clutch with a selector is provided, in which support grooves are formed to one of an inner race and an outer race, while pocket parts are formed to the other. A resilient member is provided to bias rollers disposed between the inner race and outer race toward the pocket parts. A roller-holding surface of the support groove and a roller-holding surface of the pocket part are formed with an inclination angle such that, when the rollers are held therebetween, a force acts on the rollers in a direction to move the rollers toward the pocket parts. In the lock mode, the rollers are each held by the support groove, pocket part, and selector.

9 Claims, 10 Drawing Sheets

SELECTABLE CLUTCH

BACKGROUND OF THE INVENTION

1. Field of the Invention

The present invention relates to a selectable clutch configured to be switchable between a free mode that allows relative rotation of an outer race and an inner race in both forward and reverse directions, and a lock mode that prohibits relative rotation of the outer race and inner race in one or both of the forward and reverse directions.

2. Description of the Related Art

Ratchet-type positive clutches that use mechanical engagement to couple, for example, an input shaft and an output shaft are known as one type of clutch that transmits or interrupts torque from the input shaft to the output shaft.

Some of the known clutches are equipped with a ratchet mechanism, which is composed of a plurality of pawls as torque transmission members, for example, which are provided in inner circumferential portions of the outer race so as to be rotatable, and teeth, which are provided in outer circumferential portions of the inner race, and with which the pawls engage (see, for example, Japanese Patent Application Publications Nos. 2021-156432, 2022-047794, 2022-038806, and 2022-165688).

The ratchet-type clutch described in Japanese Patent Application Publication No. 2021-156432, for example, has a plurality of first pawls biased by a spring radially inward, and a plurality of second pawls biased by the spring radially inward and circumferentially oriented differently from the first pawls. The first pawls are for locking the rotation of the inner race in one direction while allowing the rotation of the inner race in the other direction. The second pawls are for allowing the rotation of the inner race in one direction while locking the rotation of the inner race in the other direction.

An annular switch plate is disposed coaxially with the inner race and adjacently to the inner race on one side in the direction of the center axis. Rotating the switch plate can change the combination of engagement and disengagement of the first pawls and second pawls relative to the teeth of the inner race.

Another example of known ratchet-type clutches is composed of a pocket plate and a notch plate, each having a flat clutch surface and disposed so as to be rotatable relative to each other, with their clutch surfaces facing each other. The pocket plate has, in the clutch surface, a plurality of accommodating recesses, each of which accommodates a strut. The notch plate has, in the clutch surface, a plurality of notches (engagement recesses) (see, for example, Japanese Patent Application Publication No. 2021-102980).

In this ratchet-type clutch, the springs provided in the accommodating recesses each bias the respective struts toward the notch plate. When the notch plate is rotated relative to the pocket plate in the engaging direction, portions of the struts engage with the engagement recesses so that power can be transmitted. When the notch plate is rotated relative to the pocket plate in the opposite direction from the engaging direction, the struts and engagement recesses are disengaged to disable power transmission.

A selector plate that is rotatable relative to the pocket plate is disposed between the pocket plate and the notch plate, to allow switching between the state in which power is transmissible and the state in which power is not transmissible, by relative rotation of the selector plate.

SUMMARY OF THE INVENTION

One issue with selectable clutches configured to be switchable between a free mode and a lock mode is that the switching from the lock mode to the free mode is hard due to the load, applied to the torque transmission members, remaining until the torque reduces.

Torque transmission members in the form of pawls or struts are designed to be biased in the locking direction by springs. For this reason, when a case where the selector is driven for some reason to lock the pawls or struts in the free mode in which the inner race is rotating relative to the outer race, the impact of the sudden engagement may cause chipping or damage.

In a case with a ratchet-type clutch having pawls, if it is of the configuration in which the inner race is rotated, the pawls are provided to the outer race side, and engaging portions are provided to the inner race side. In this case, the selector needs to be disposed to the inner race side, which makes the selector less accessible from a drive source such as an actuator. On the other hand, if the pawls are provided to the inner race side and the engaging portions are provided on the outer race side, the pawls will rotate with the inner race and be subjected to the influence of the centrifugal force.

Furthermore, a ratchet-type clutch having pawls configured as a two-way clutch tends to be large because of the necessity to provide pairs of pawls opposite each other, which also makes it difficult to handle high torque. Another issue with the pawls is the possibility of chipping upon impact or wear because of the high surface pressure applied to small torque-receiving surfaces of the pawls.

The present invention has been made under the circumstances described above and it is an object of the invention to provide a selectable clutch that has a simple structure, reduces friction loss, prevents noise generation, allows a size reduction, and helps extend the service life. The present invention achieves the above object by providing a selectable clutch including: a cylindrical inner race and a cylindrical outer race that are coaxial and rotatable relative to each other; a plurality of rollers disposed between the inner race and the outer race; and a resilient member radially biasing the rollers. One of an outer circumferential surface of the inner race and an inner circumferential surface of the outer race is formed with pocket parts configured to accommodate the rollers and each having a roller-holding surface inclined relative to a circumferential direction, and the other of the outer circumferential surface of the inner race and the inner circumferential surface of the outer race is formed with support grooves each having a roller-holding surface inclined relative to the circumferential direction. The resilient member is provided to bias the rollers toward the pocket parts. The selectable clutch further includes a selector axially adjacent one of the inner race and the outer race that is provided with the pocket parts, the selector being disposed so as to be rotatable independently of the inner race and the outer race. The selector includes a roller-holding surface that makes contact with the rollers in a state in which the rollers are supported by the support grooves. The selector is configured to allow switching between a free mode that allows relative rotation between the inner race and the outer race, and a lock mode that prohibits relative rotation between the inner race and the outer race. The roller-holding surface of each pocket part and the roller-holding surface of each support groove are formed with an inclination angle such that, when a roller is held therebetween, a force acts on the roller in a direction to move the roller toward a corresponding pocket part. The rollers are configured such as to be held between roller-holding surfaces of the support grooves, roller-holding surfaces of the pocket parts, and the roller-holding surface of the selector in the lock mode.

According to the invention set forth in claim 1, the rollers are held between roller-holding surfaces of the support grooves, roller-holding surfaces of the pocket parts, and the roller-holding surface of the selector in the lock mode. With this configuration, no windup or torsional deflection occurs when torque is transmitted, which allows the selectable clutch to be configured as a high-rigidity clutch, and helps configure a simple structure that can achieve stable engagement.

The resilient member is provided to bias the rollers toward the pocket parts, and the respective roller-holding surfaces of the pocket parts and the support grooves are formed with an inclination angle such that, when the rollers are held therebetween, a force acts on the rollers in a direction to move the rollers toward the pocket parts. This means that the rollers are separated from the inner race or the outer race in the free mode, which facilitates reduction of friction loss and noise. This also means that, when switching the clutch from the lock mode to the free mode, the selector can readily be rotated with a small force even when some torque still remains. Thus the rollers can readily be separated from the support grooves by rotating the selector, to release the lock. The inclination angles of the roller-holding surfaces of one or both of the pocket parts and support grooves may be changed as required on one side in the forward direction and the other side in the reverse direction. This will allow adjustment of the torque load to be carried in both of the forward direction and the reverse direction, which facilitates an attempt to improve performance stability.

Furthermore, the large number of rollers accommodated in a small space, with each roller contributing to the locking in both forward and reverse directions, enable size reduction, and allow the clutch to transmit high torque despite the small size.

Moreover, the rollers are held between respective roller-holding surfaces of the support grooves, pocket parts, and selector to engage the inner and outer races, so that the torque is received by more surfaces and can be dispersed. Therefore, the surface pressure applied to the rollers and the roller-holding surfaces that hold the rollers can be reduced. This allows the clutch to be designed with an inexpensive material that is more resistant to chipping, which may be caused by impact, or wear. Since the rollers rotate themselves and substantially do not engage at the same point, the durability of the clutch can be improved and its service life can be extended.

According to the invention set forth in claim 2, the pocket parts are formed on an inner circumferential surface of the outer race, and the support grooves are formed on an outer circumferential surface of the inner race. Therefore, the selector can be disposed on the outer race side, even in a configuration in which the inner race is the one that is rotated. This allows easy access to the selector from a drive mechanism for rotating the selector. Moreover, the rollers are held on the outer race and less affected by the centrifugal force.

According to the invention set forth in claim 3, by rotating the selector, the rollers accommodated inside the pocket parts can be readily moved radially toward the support grooves by the action of the guide surface of the roller-receiving recesses. Not only is the switching from the free mode to the lock mode made easy, but also reliable locking is achieved.

According to the invention set forth in claim 4, the pin member and the rotation restriction groove restricting the movable range of the selector can prevent the selector from overrunning, ensuring the reliable switching between the free mode and the lock mode.

According to the invention set forth in claim 5, the open edges of the support grooves are chamfered or rounded. During the rotation of one of the inner race and outer race that is formed with the support grooves at a certain speed or more, the rollers may attempt to move toward the support grooves by an erroneous operation or malfunction of the selector. The chamfers thrust the rollers back toward the pocket parts in such instances to prevent engagement between the inner race and outer race, so that high safety is achieved.

According to the invention set forth in claim 6, during the switching from the free mode to the lock mode, when the pocket parts and the support grooves are out of alignment, the selector is stopped from rotating through compression of a delay spring, so that the clutch can be maintained in the lock wait state. As soon as the pocket parts and the support grooves come into alignment, the biasing force of the delay spring is released, allowing the selector to rotate, to enable the lock. This reliably prevents chipping or damage caused by the impact of sudden engagement, which facilitates extension of the service life, as well as ensures high safety.

According to the invention set forth in claim 7, the selectable clutch includes a position restriction part that restricts the movable range of a drive rod of the selector drive mechanism. This prevents an excessive action of the selector that may be caused by the biasing force of the delay spring when it is compressed more than necessary, so that overrunning of the selector can be prevented even more reliably.

According to the invention set forth in claim 8, the selectable clutch has a lock position retention function, which reliably prevents unintended rotation of the selector that may occur by vibration, for example, so that the lock mode can be maintained.

According to the invention set forth in claim 9, the resilient member is a component shared by the plurality of rollers, so that the number of components can be reduced, which facilitates size reduction. The use of one resilient member also facilitates the setting of the biasing force required to ensure that the inner race and outer race do not engage during the rotation of one of the inner race and outer race that is formed with the support grooves at a certain speed or more.

DESCRIPTION OF THE PREFERRED EMBODIMENTS

First Embodiment

Figure 1:
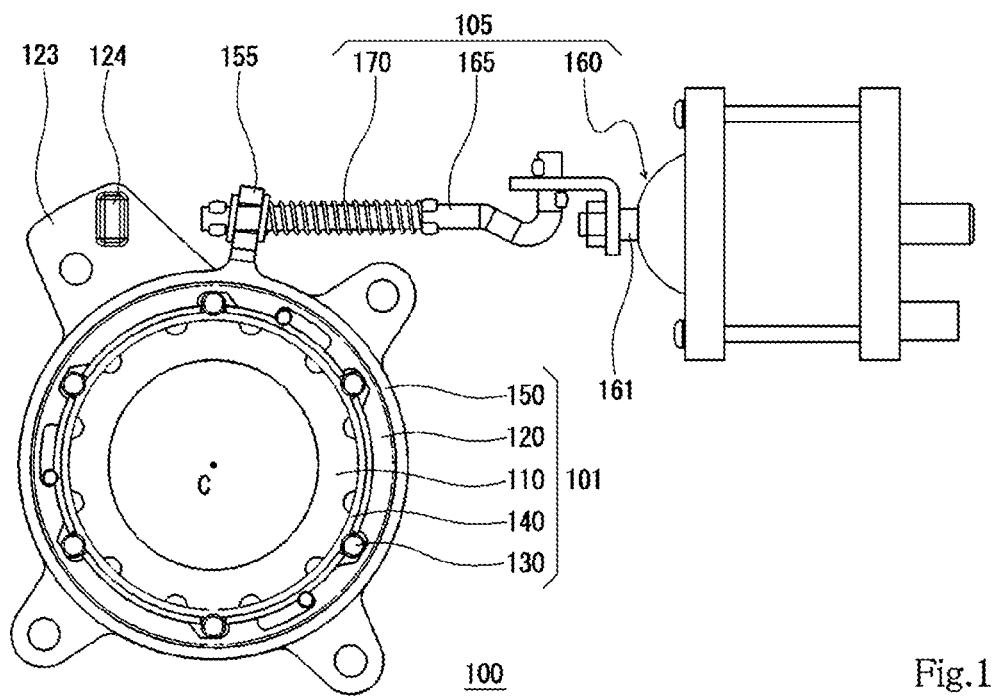
FIG. 1 is a plan view illustrating one configuration example of a selectable clutch according to a first embodiment of the present invention as seen from the front side in the axial direction.
Figure 2:
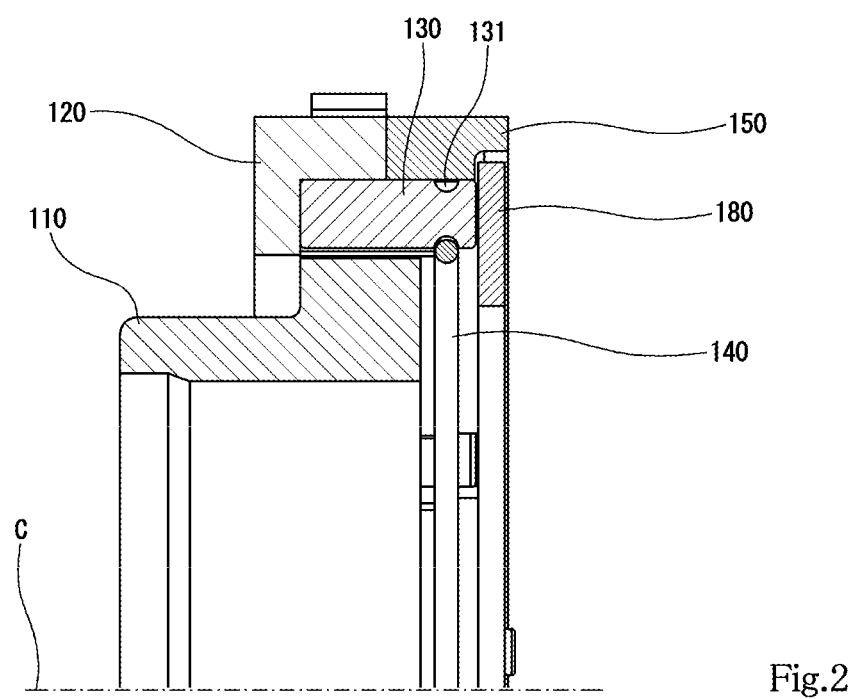
FIG. 2 is a partial cross-sectional view along the rotation axis illustrating the configuration of a clutch mechanism of the selectable clutch shown in FIG. 1.

This selectable clutch 100 includes a clutch mechanism 101 with a selector 150, and a selector drive mechanism 105, as shown in FIG. 1 and FIG. 2.

The clutch mechanism 101 includes an inner race 110 and an outer race 120 that are coaxial and rotatable relative to each other, a plurality of rollers 130 disposed between an outer circumferential surface of the inner race 110 and an inner circumferential surface of the outer race 120, a resilient member 140 radially biasing the rollers 130, and the selector 150, which is configured to switch the clutch between the free mode that allows relative rotation of the inner race 110 and outer race 120 in both forward and reverse directions, and the lock mode that prohibits relative rotation of the inner race 110 and outer race 120 in both forward and reverse directions. Reference symbol C in FIG. 1 and FIG. 2 denotes the rotation axis.

Figure 3:
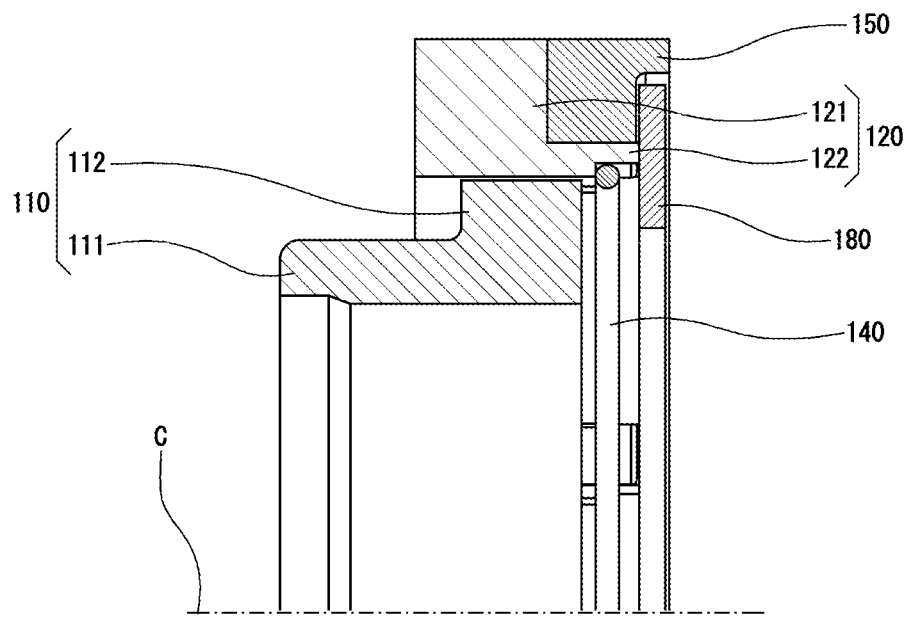
FIG. 3 is a partial cross-sectional view along the rotation axis illustrating the configuration of the clutch mechanism at a position different from that of FIG. 2 of the selectable clutch shown in FIG. 1.

In this embodiment, the inner race 110 has a two-step cylindrical shape, and includes a small-diameter cylindrical part 111 and a large-diameter cylindrical part 112 continuous with one end of the small-diameter cylindrical part 111, as shown also in FIG. 3.

The outer race 120 includes an annular plate-like base part 121, a cylindrical support wall part 122 protruding axially from an inner peripheral edge of the base part 121, and a mounting part 123 provided on an outer circumferential surface of the base part 121. A counterbore-like recess is formed at the open end of the support wall part 122, for the resilient member 140 to be set.

The outer circumferential surface of the inner race 110 and the inner circumferential surface of the outer race 120 are opposite each other in close proximity. In this embodiment, as shown also in FIG. 4, plural support grooves 115 are formed at predetermined circumferential intervals on the outer circumferential surface of the inner race 110, and plural pocket parts 125 are formed on the inner circumferential surface of the outer race 120, each corresponding to each of the rollers 130. Note, in this embodiment, while six rollers 130 are circumferentially arranged at predetermined intervals, there are more support grooves 115 than the rollers 130.

This configuration in which the support grooves 115 are formed on the outer circumferential surface of the inner race 110 and the pocket parts 125 are formed on the inner circumferential surface of the outer race 120 allows the selector 150 to be disposed on the outer race 120 side even though the inner race 110 is the one that is rotated, providing the selector drive mechanism 105 with easy access to the selector 150. Moreover, since the rollers 130 are held on the outer race 120 side, they are less affected by the centrifugal force.

The support grooves 115 have a roller-holding surface 116 that is inclined relative to the circumferential direction, and extend in the direction of the rotation axis.

In this embodiment, the support grooves 115 are formed as recessed grooves with a circular arc cross-sectional shape, for example, to be able to support the rollers 130 by receiving part of the circumferential surface of the rollers 130. The roller-holding surface 116 is formed by a side face of the groove.

The open edges of the support grooves 115 are chamfered.

The pocket parts 125 are configured to be able to accommodate the rollers 130, and have a roller-holding surface 126 that is inclined relative to the circumferential direction.

In this embodiment, the pocket parts 125 are formed as recessed grooves extending from one end face of the support wall part 122 in the direction of the rotation axis. The grooves have a cross-sectional shape that is formed by an isosceles trapezoid and a circle that passes through the vertices of the two equal sides, for example. The roller-holding surface 126 is formed by a side face of the recessed groove.

In this embodiment, the roller-holding surface 126 of the pocket part 125 on one side in the forward direction, and the roller-holding surface 126 on the other side in the reverse direction, are each inclined relative to the radial direction at the same angle. These roller-holding surfaces may instead be formed with a difference in their inclination angles. Such a configuration will allow adjustment of the torque load to be carried both in the forward direction and the reverse direction, which facilitates an attempt to improve performance stability.

The plural rollers 130 are each shaped to protrude axially outward from one end face of the base part 121 of the outer race 120 when accommodated in the pocket parts 125. A spring mount groove 131 extends circumferentially all around on the circumferential surface of the protruded part of the roller.

As shown in FIG. 2, the plural rollers 130 are each restricted from axial movement by an annular plate-like stopper plate 180 on one axial end and the end walls on the other axial end of the pocket parts 125.

The resilient member 140, which is a common component shared by the plurality of rollers 130, is fitted from inside into the spring mount grooves 131 of the rollers 130, such as to bias the rollers 130 radially outward toward respective pocket parts 125. Namely, the resilient member 140 is provided such that the rollers 130 are held on the outer race 120 side, and biases the rollers 130 such that the selectable clutch 100 maintains the free mode.

In this embodiment, the resilient member 140 is an annular garter spring. A ribbon spring, for example, may be used instead.

Using the resilient member 140 that is a common component shared by the plurality of rollers 130 enables a reduction in the number of components as well as in the size. The use of one resilient member also facilitates the setting of the biasing force required to ensure that the inner race 110 and outer race 120 do not engage during the rotation of the inner race 110 at a certain speed or more.

The selector 150, which is composed of a cylindrical member, is axially adjacent the outer race 120 that is formed with the pocket parts 125, and disposed coaxially with the inner race 110 and outer race 120.

The selector 150 is provided such as to be rotatable independently of the inner race 110 and outer race 120. The selector is configured to move the rollers 130 radially when rotated, to switch the selectable clutch 100 between the free mode and the lock mode. In this embodiment, when the selectable clutch 100 is in the free mode, rotating the selector 150 in the locking direction (counterclockwise in FIG. 1) can cause the rollers 130 accommodated in the pocket parts 125 to move radially inward toward the support grooves 115. When the selectable clutch 100 is in the lock mode, rotating the selector 150 in the unlocking direction (clockwise in FIG. 1) can cause the rollers 130 supported by the support grooves 115 to move radially outward toward the pocket parts 125.

Figure 5:
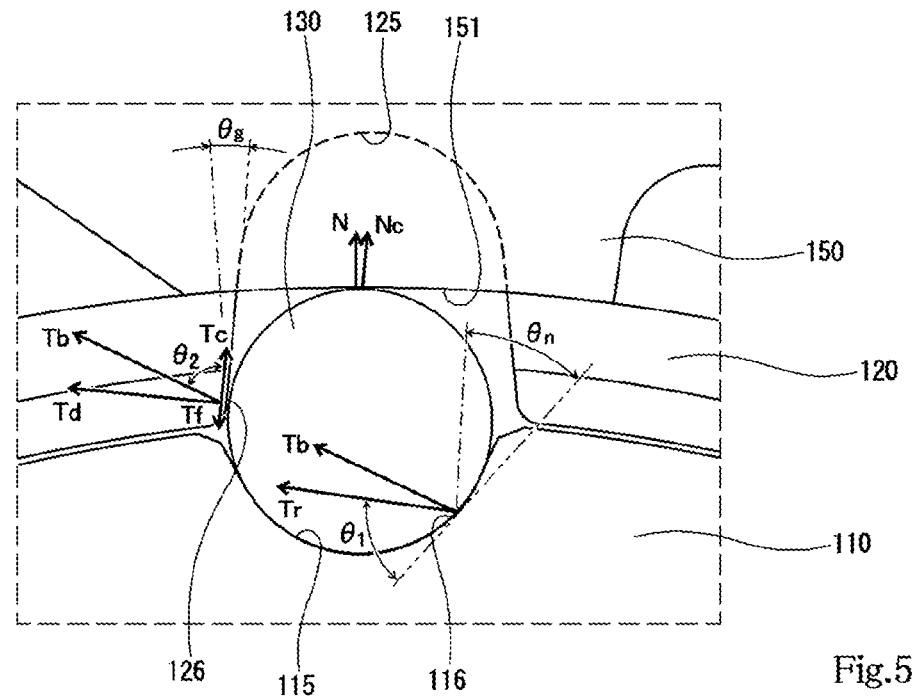
FIG. 5 is a vector diagram illustrating the loads that act on a roller when the clutch is in a lock mode.

An inner circumferential surface of the selector 150 forms a roller-holding surface 151 that makes contact with the rollers 130 when the rollers 130 are supported by the support grooves 115 (see FIG. 5).

Figure 4:
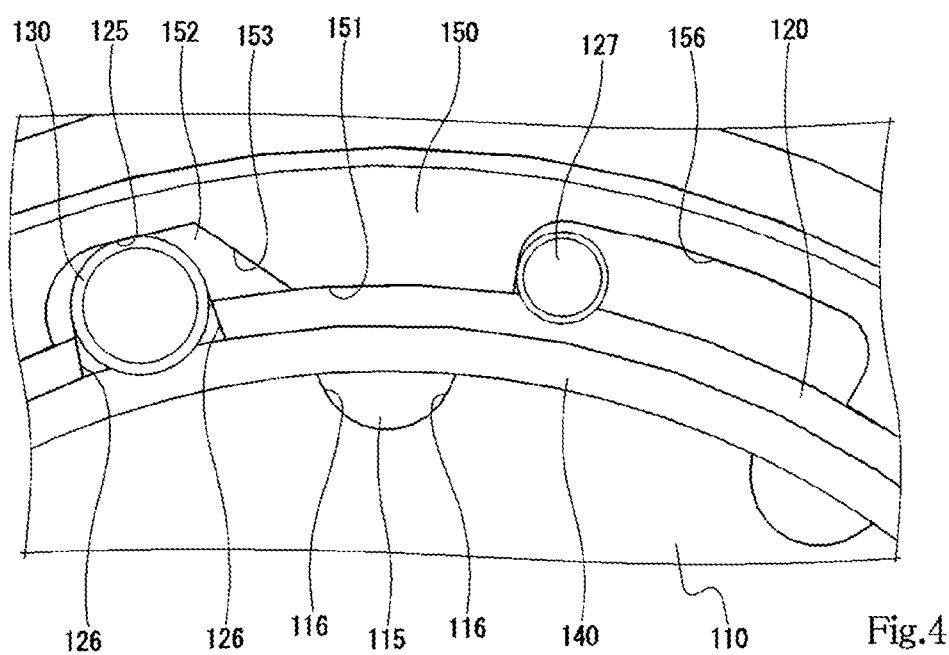
FIG. 4 is an enlarged plan view illustrating the configuration of a main part of the clutch mechanism in the selectable clutch shown in FIG. 1.

As shown in FIG. 4, on the inner circumferential surface of the selector 150 are formed roller-receiving recesses 152 that are configured to be able to receive the rollers 130 when the selectable clutch 100 is in the free mode in which the rollers 130 are accommodated in the pocket parts 125.

The roller-receiving recess 152 includes a tapered guide surface 153 configured to radially move the roller 130 toward the support groove 115 as the selector 150 is rotated in the locking direction.

This selectable clutch 100 includes a rotation restriction mechanism for restricting the movable range of the selector 150.

In this embodiment, the rotation restriction mechanism is made up of pin members 127 and rotation restriction grooves 156. The pin members 127 extend axially from one side of the base part 121 of the outer race 120 that is formed with the pocket parts 125. The rotation restriction grooves 156 extend circumferentially on the inner circumferential surface of the selector 150 such as to allow the pin members 127 to slide therein.

The selector drive mechanism 105 includes, as shown in FIG. 1, a linear actuator 160 with a drive shaft 161 that is driven to reciprocate in one direction (left and right direction in FIG. 1); a drive rod 165 coupled at one end to the drive shaft 161 and connected at the other end to a bearing part 155 on an outer circumferential surface of the selector 150 such as to be movable back and forth in the one direction between a free position to switch the selectable clutch 100 to the free mode and a lock position to switch the selectable clutch 100 to the lock mode; and a delay spring 170 disposed to be resiliently deformed in a compressed manner when the drive rod 165 is moved toward the lock position to rotate the selector 150 in the locking direction.

In this embodiment, the delay spring 170 is a coil spring, with the drive rod 165 passing therethrough.

The actuator 160 has a lock position retention function for keeping the selector 150 in position by retaining the drive rod 165 at the lock position when the selectable clutch 100 is switched to the lock mode. This function reliably prevents unintended rotation of the selector 150 that may occur by vibration, for example, so that the lock mode can be maintained.

This selectable clutch 100 also includes a rod position restriction mechanism for restricting the movable range of the drive rod 165.

In this embodiment, as shown in FIG. 1, the rod position restriction mechanism is formed by a position restriction part 124 on the mounting part 123 of the outer race 120 that is positioned beyond the lock position in the one direction.

In the selectable clutch 100 described above, the roller-holding surface 116 of the support groove 115 and the roller-holding surface 126 of the pocket part 125 are formed with inclination angles such that when the roller 130 is held therebetween, a force acts on the roller 130 in a direction to move the roller 130 toward the pocket part 125. In the lock mode, the roller 130 is held by the roller-holding surface 116 of the support groove 115, the roller-holding surface 126 of the pocket part 125, and the roller-holding surface 151 of the selector 150.

More specifically, as shown in FIG. 5, when the inner race 110 and outer race 120 engage, the roller 130 receives a normal force Tb [N] expressed as (Tr·sin $\theta_1$) from the roller-holding surface 116 of the support groove 115, where Tr [N] is the load acting on the roller 130. Angle $\theta_1$ represents the angle [°] expressed as (90°−θn), where θn is the angle [°] of the load acting surface of the roller-holding surface 116 relative to the radial direction.

The pocket part 125 receives a component of force Tc [N] expressed as (Tb·cos $\theta_2$) parallel to the roller-holding surface 126 from roller 130 in the direction along the roller-holding surface 126 of the pocket part 125 from, as well as a normal force Td [N] expressed as (Tb·sin $\theta_2$) perpendicular to the roller-holding surface 126. Angle $\theta_2$ represents the angle [°] expressed as (90°−($\theta_n$−$\theta_g$)), where $\theta_g$ is the angle [°] of the roller-holding surface 126 relative to the radial direction. Furthermore, a frictional force Tf [N] expressed as μ·Td acts on the roller-holding surface 126, where μ represents the friction coefficient of the roller-holding surface 126.

Therefore, the roller 130 receives a push-out force Nc [N] expressed as (Tc−μTd) along the roller-holding surface 126 of the pocket part 125 toward the pocket part 125, as well as a component of force N [N] expressed as (Nc·cos $\theta_2$) radially outward. The component N of the push-out force Nc and the biasing force of the resilient member 140 are received by the roller-holding surface 151 of the selector 150, which enables the inner race 110 and outer race 120 to engage each other. Rotating the selector 150 in the unlocking direction can separate the selector 150 from the rollers 130, and allows the lock to be released.

Figure 6A:
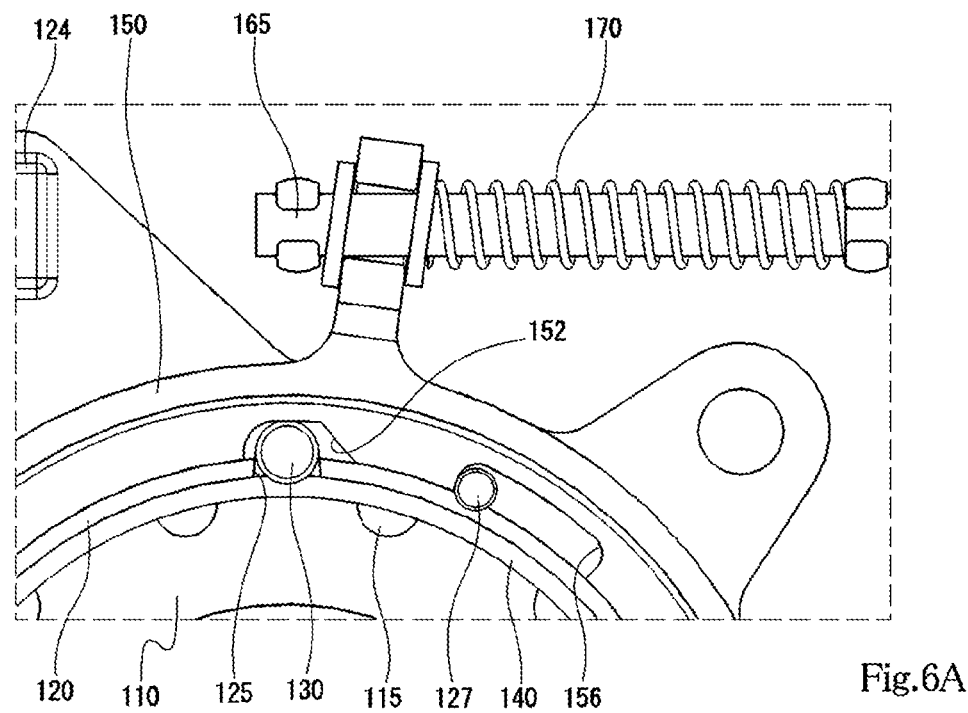
FIG. 6A is a schematic diagram of the selectable clutch shown in FIG. 1 in a free mode.

When the selectable clutch 100 according to this embodiment is in the free mode in which the drive rod 165 is located at the free position, the rollers 130, being biased by the resilient member 140, are positioned inside the pocket parts 125 of the outer race 120 and in the roller-receiving recesses 152 of the selector 150, as shown in FIG. 6A. The rollers 130 are separated from the inner race 110 during its rotation, which facilitates reduction of friction loss and noise.

Figure 6B:
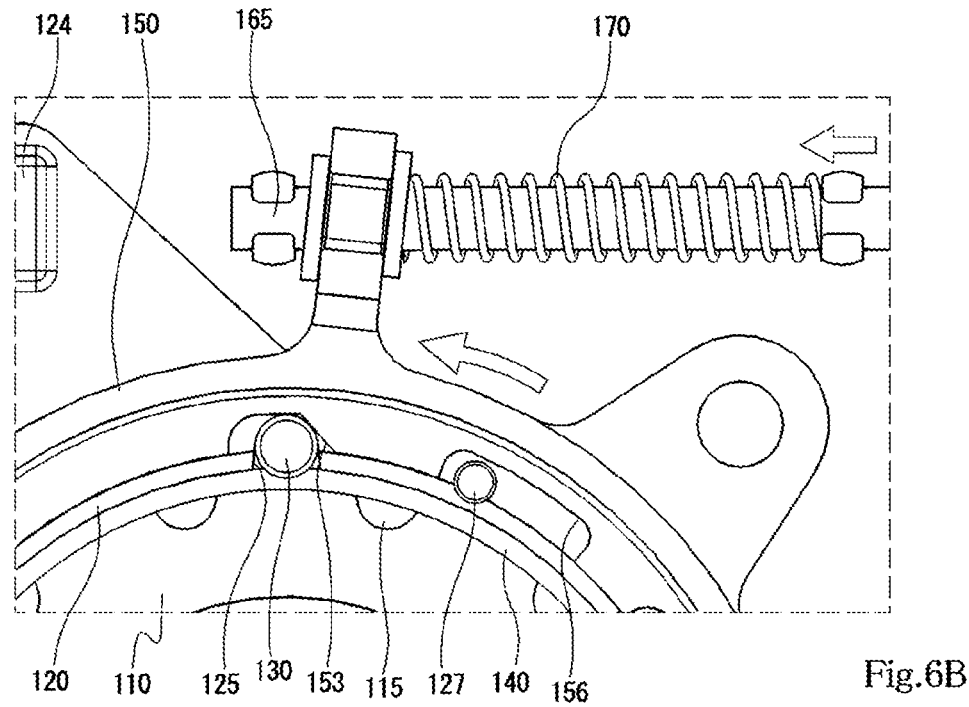
FIG. 6B is a schematic diagram of the selectable clutch shown in FIG. 1 being switched from the free mode to the lock mode, when a drive rod is driven toward a lock position.

When the selectable clutch 100 is switched from the free mode to the lock mode, as the drive rod 165 is driven toward the lock position, the selector 150 rotates in the locking direction so that the respective guide surfaces 153 of the roller-receiving recesses 152 of the selector 150 make contact with the rollers 130, as shown in FIG. 6B.

Figure 6C:
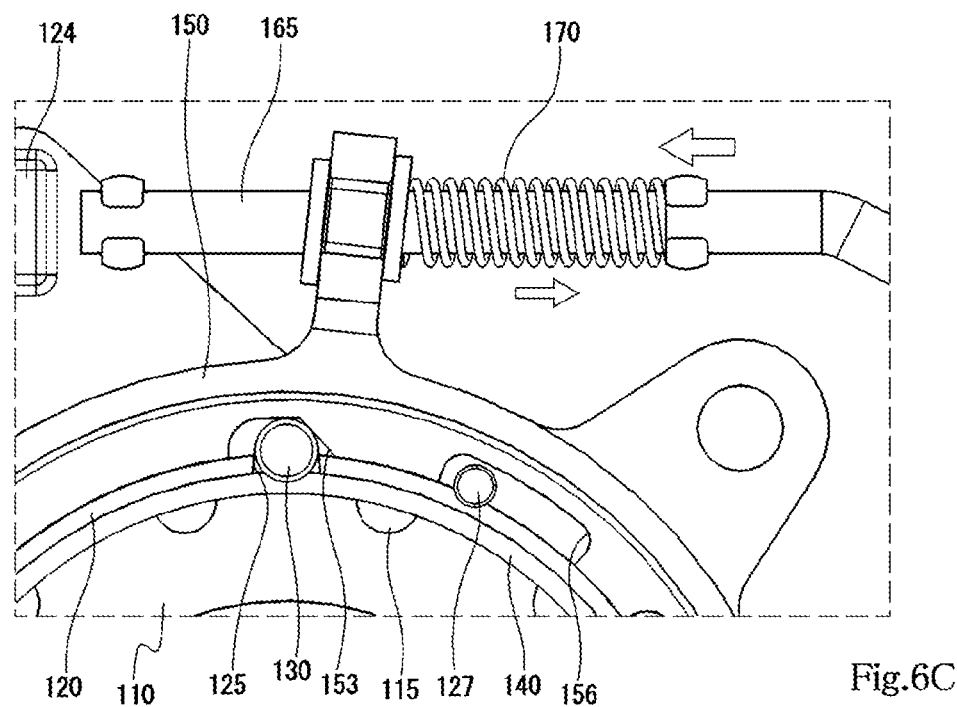
FIG. 6C is a schematic diagram of the selectable clutch shown in FIG. 1 in a lock wait state.

When the support grooves 115 of the inner race 110 and the pocket parts 125 of the outer race 120 are out of alignment at this time, the delay spring 170 provided to the selector drive mechanism 105, by being compressed, allows the drive rod 165 to move further toward the lock position, while the selector 150 is stopped from rotating, as shown in FIG. 6C. Accordingly, the selectable clutch 100 maintains a lock wait state.

During the rotation of the inner race 110 at a certain speed or more, the rollers 130 attempting to move toward the support grooves 115, by an erroneous operation or malfunction of the selector 150, are thrust back toward the pocket parts 125 by the chamfered open edges of the support grooves 115. This reliably prevents chipping or damage caused by the impact of sudden engagement between the inner race 110 and outer race 120, which facilitates extension of the service life, as well as ensures high safety.

Figure 6D:
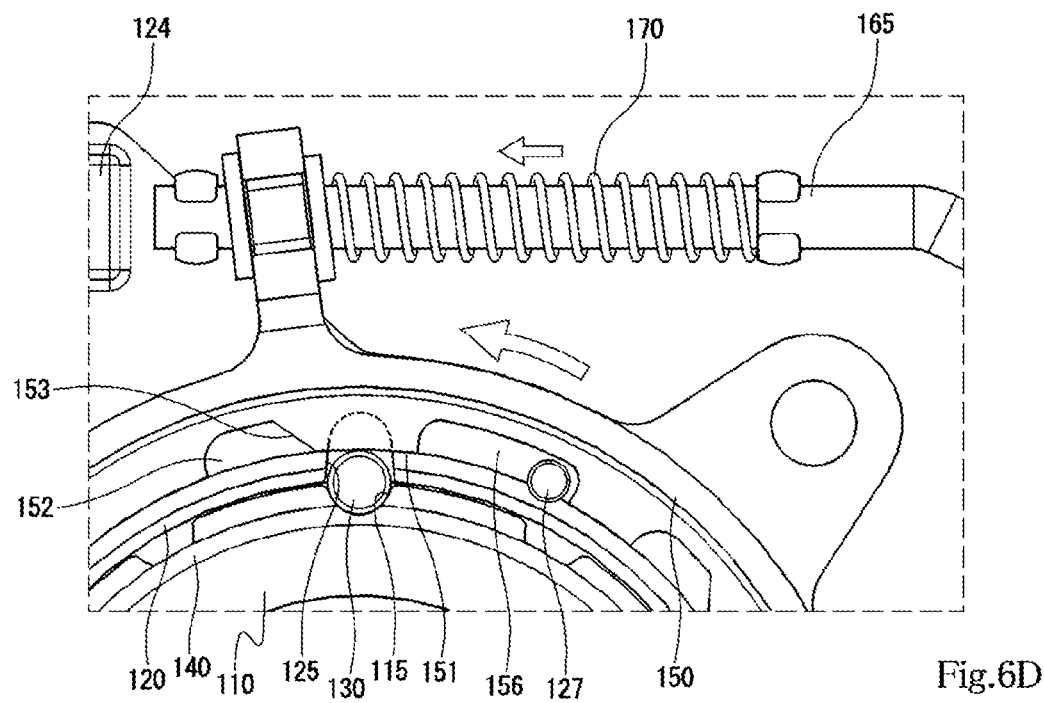
FIG. 6D is a schematic diagram of the selectable clutch shown in FIG. 1 when switched to the lock mode.

When the support grooves 115 and the pocket parts 125 come into alignment, the biasing force of the delay spring 170 is released as shown in FIG. 6D, allowing the selector 150 to rotate in the locking direction. The rollers 130 then move radially toward the support grooves 115 by the action of the guide surfaces 153 of the roller-receiving recesses 152.

At this time, the pin members 127 and rotation restriction grooves 156 restricting the movable range of the selector 150 can prevent the selector 150 from overrunning, ensuring the reliable switching between the free mode and the lock mode.

When the selectable clutch 100 is held in the lock wait state, the position restriction part 124 that restricts the movable range of the drive rod 165 prevents the delay spring 170 from being excessively compressed. This saves the delay spring 170 itself from being damaged, as well as prevents an excessive action of the selector 150 when the biasing force of the delay spring 170 is released, so that overrunning of the selector 150 can be prevented even more reliably.

When the rollers 130 move into the support grooves 115, the roller-holding surface 116 of the support grooves 115 and the roller-holding surface 126 of the pocket parts 125 hold the rollers 130 in the circumferential direction, as well as the roller-holding surface 151 of the selector 150 makes contact with the rollers 130, and thus the inner race 110 and outer race 120 engage with each other.

No windup or torsional deflection occurs in the races engaged this way as would in frictional clutches when torque is transmitted, which allows the selectable clutch 100 to be designed as a high-rigidity clutch, and helps design a simple structure that can achieve stable engagement. Moreover, the surface pressure that acts on the rollers 130 and the roller-holding surfaces 116, 126, and 151 during engagement can be reduced. This allows the clutch to be designed with inexpensive materials that are more resistant to chipping, which may be caused by impact, or wear. The rollers 130 rotating themselves and substantially not engaging at the same point allow the durability of the clutch to be improved and the service life to be extended. Furthermore, the large number of rollers 130 accommodated in a small space, each roller 130 contributing to the locking in both forward and reverse directions, enable size reduction, and allow the clutch to transmit high torque despite the small size.

To switch the selectable clutch 100 from the lock mode to the free mode, the drive rod 165 is driven from the lock position toward the free position to rotate the selector 150 in the unlocking direction. At this time, the resilient member 140 biases the rollers 130 toward the pocket parts 125. Further, the roller-holding surfaces 126 of the pocket parts 125 and the roller-holding surfaces 116 of the support grooves 115 are formed with inclination angles such that, when the rollers 130 are held therebetween, a force acts on the rollers 130 in a direction to move the rollers toward the pocket parts 125. Therefore, the selector 150 can be rotated easily with a small force even when some torque still remains. As the roller-holding surface 151 of the selector 150 is moved away from the rollers 130, the rollers 130 can separate from the support grooves 115, so that the lock can readily be released.

Figure 7:
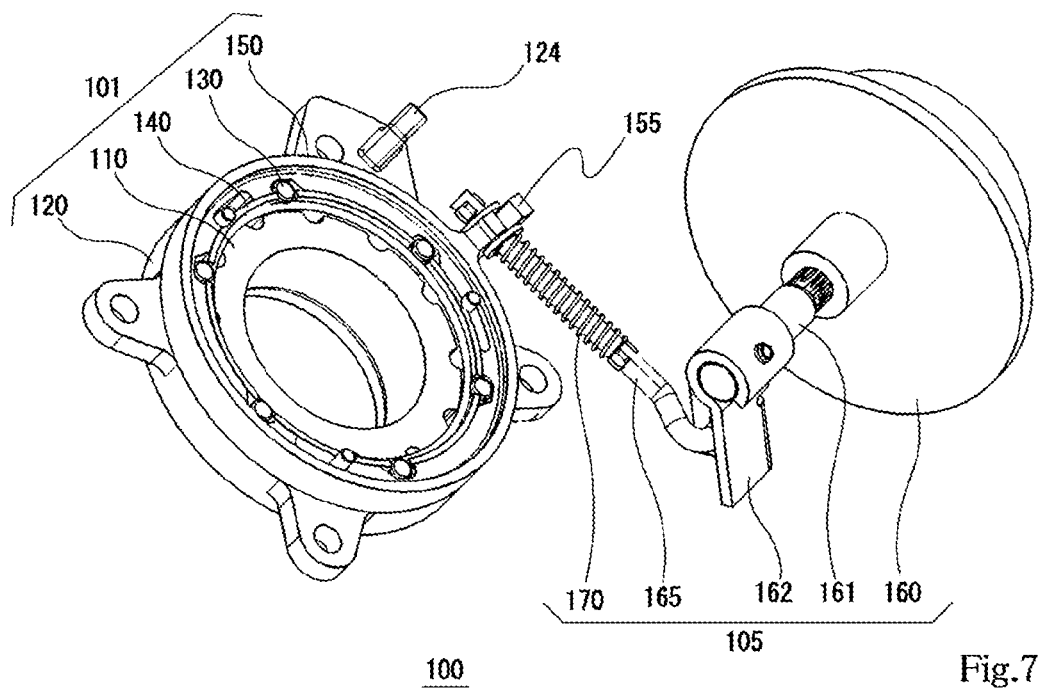
FIG. 7 is a perspective view illustrating another configuration example of the selectable clutch according to the present invention.
Figure 8:
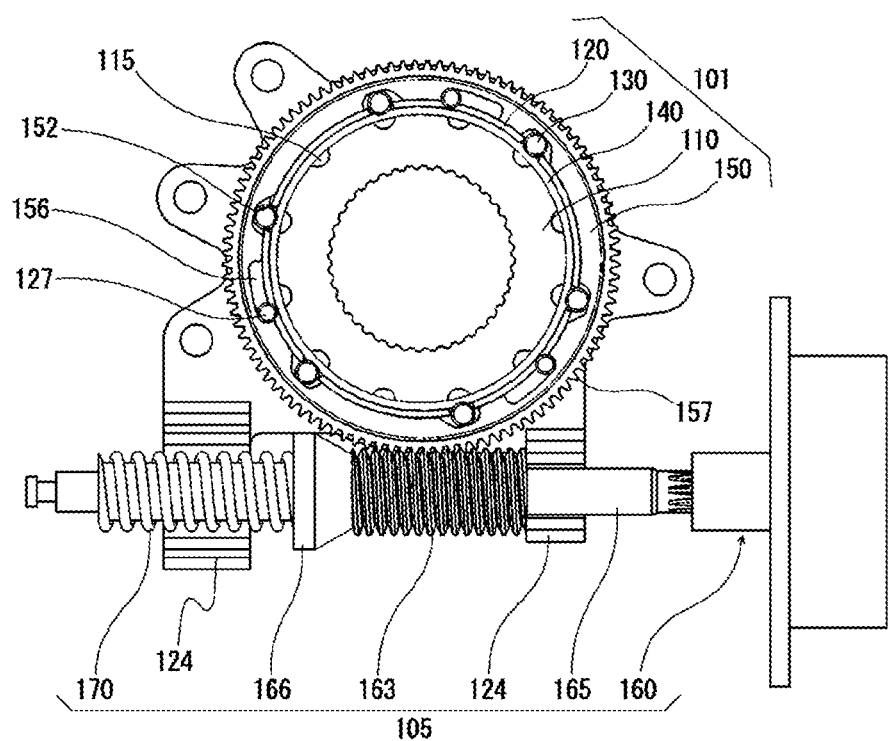
FIG. 8 is a plan view illustrating yet another configuration example of the selectable clutch according to the present invention as seen from the front side in the axial direction.

While the configuration described in the embodiment above as the selector drive mechanism 105 is equipped with a linear actuator as the drive source, the selector drive mechanism 105 may have a rotary actuator as the drive source as shown in FIG. 7, or a configuration that uses a worm gear mechanism as shown in FIG. 8.

The clutch mechanism 101 of the selectable clutch 100 shown in FIG. 7 has the same configuration as that of the selectable clutch 100 shown in FIG. 1. Like reference numerals are given to the same components and description thereof will be omitted.

The selector drive mechanism 105 of the selectable clutch 100 shown in FIG. 7 includes a rotary actuator 160 with a drive shaft 161 that is driven and rotated in both forward and reverse directions; a rotary arm 162 provided to the drive shaft 161; a drive rod 165 coupled at one end to the rotary arm 162 and connected at the other end to the bearing part 155 on the outer circumferential surface of the selector 150 such as to move back and forth in the one direction between a free position to switch the selectable clutch 100 to the free mode and a lock position to hold the selectable clutch 100 in the lock mode; and a delay spring 170 disposed to be resiliently deformed in a compressed manner when the drive rod 165 is moved toward the lock position.

In this embodiment, the delay spring 170 is a coil spring, with the drive rod 165 passing therethrough.

The actuator 160 has a lock position retention function for keeping the selector 150 in position by retaining the drive rod 165 at the lock position when the selectable clutch 100 is switched to the lock mode. This function reliably prevents unintended rotation of the selector 150 that may occur by vibration, for example, so that the lock mode can be maintained.

In this selectable clutch 100, when switching the selectable clutch 100 from the free mode to the lock mode, the drive shaft 161 is driven and rotated in the forward direction to rotate the rotary arm 162, to move the drive rod 165 toward the lock position. When the support grooves 115 of the inner race 110 and the pocket parts 125 of the outer race 120 are out of alignment at this time, the delay spring 170 is compressed, allowing the drive rod 165 to move further toward the lock position, while the selector 150 is stopped from rotating. Accordingly, the selectable clutch 100 maintains a lock wait state.

When the support grooves 115 and the pocket parts 125 come into alignment, the biasing force of the delay spring 170 is released, allowing the selector 150 to rotate in the locking direction. The rollers 130 then move radially toward the support grooves 115 by the action of the guide surfaces 153 of the roller-receiving recesses 152. When the rollers 130 move into the support grooves 115, the roller-holding surface 116 of the support grooves 115 and the roller-holding surface 126 of the pocket parts 125 hold the rollers 130 in the circumferential direction, as well as the roller-holding surface 151 of the selector 150 makes contact with the rollers 130, and thus the inner race 110 and outer race 120 engage with each other.

To switch the selectable clutch 100 from the lock mode to the free mode, the drive shaft 161 is driven and rotated in the reverse direction to rotate the rotary arm 162, to move the drive rod 165 toward the free position. This rotates the selector 150 in the unlocking direction, moving the roller-holding surface 151 of the selector 150 away from the rollers 130, and allowing the rollers 130 to separate from the support grooves 115, so that the lock is released.

The clutch mechanism 101 of the selectable clutch shown in FIG. 8 is configured the same as the selectable clutch 100 shown in FIG. 1 except for the selector 150 configuration. Like reference numerals are given to the same components and description thereof will be omitted.

The selector 150 is formed with worm gear teeth 157 on its outer circumferential surface to function as a worm wheel.

Figure 9:
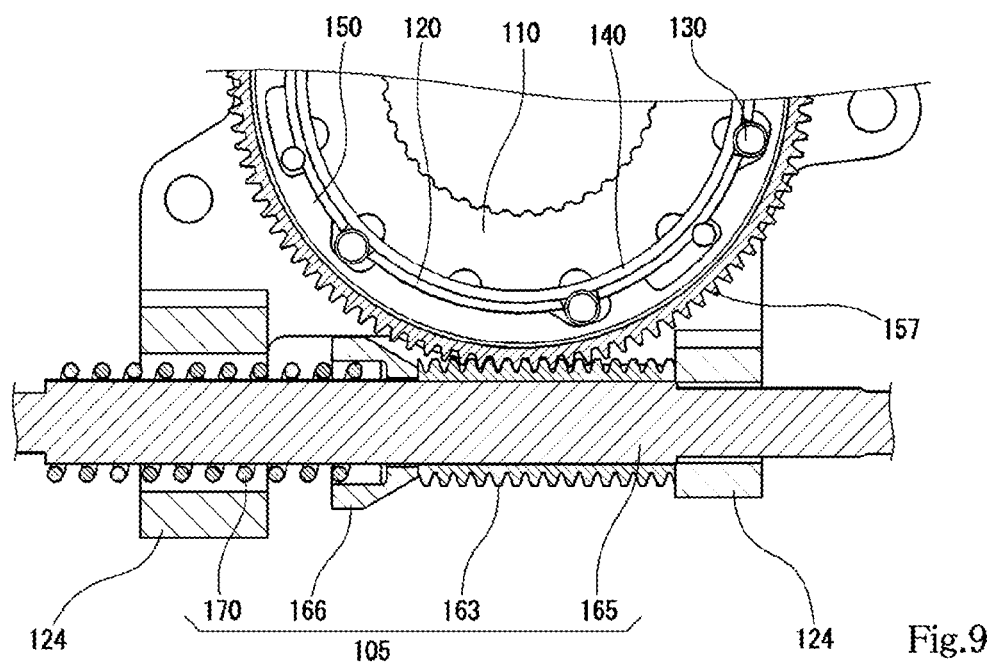
FIG. 9 is a schematic diagram illustrating a selector drive mechanism of the selectable clutch shown in FIG. 8 in a cross section perpendicular to the rotation axis.

The selector drive mechanism 105 of the selectable clutch shown in FIG. 8 includes, as shown also in FIG. 9, an actuator 160; a drive rod 165 driven by the actuator 160 to rotate in forward and reverse directions; a worm 163 slidable relative to the drive rod 165 and meshing with the worm gear teeth 157 of the selector 150; a spring receptacle 166 provided to the drive rod 165 at one end of the worm 163; and a delay spring 170, with the drive rod 165 passing therethrough, disposed at one end of the spring receptacle 166.

In this embodiment, the actuator 160 has a lock position retention function that retains torque and keeps the selector 150 in position when the selectable clutch 100 is in the lock mode. This function reliably prevents unintended rotation of the selector 150 that may occur by vibration, for example, so that the lock mode can be maintained. The lock position retention function may be realized by a design that utilizes the self-locking nature of the worm gear mechanism.

In this embodiment, the worm 163 at its other end is in contact with a position restriction part 124 on one side in the free mode. The movable range of the worm 163, when moving in the direction in which the delay spring 170 is resiliently deformed in a compressed manner, is restricted by one end of the spring receptacle 166 making contact with another position restriction part 124 on the other side.

Figure 10A:
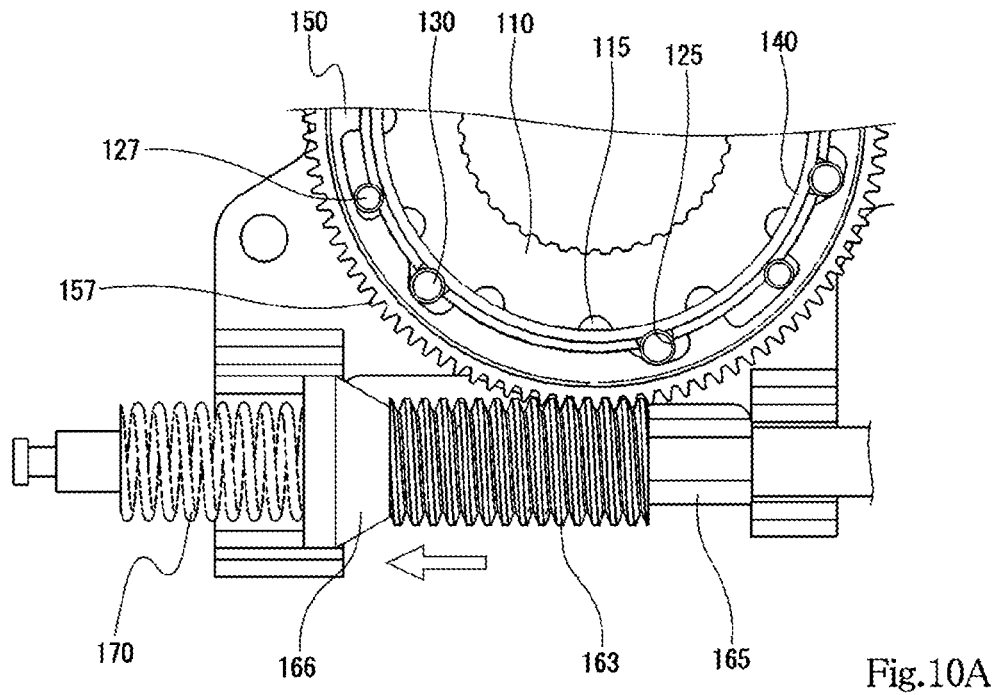
FIG. 10A is a schematic diagram of the selectable clutch shown in FIG. 8 in the lock wait state.

In this selectable clutch, when switching the selectable clutch from the free mode to the lock mode, the drive rod 165 is driven and rotated in the forward direction to rotate the worm 163, to rotate the selector 150 in the locking direction. When the support grooves 115 of the inner race 110 and the pocket parts 125 of the outer race 120 are out of alignment at this time, the selector 150 is stopped from rotating, while the worm 163 and the spring receptacle 166 are moved relative to the drive rod 165, as shown in FIG. 10A. Accordingly, the delay spring 170 is compressed, and the selectable clutch maintains a lock wait state.

Figure 10B:
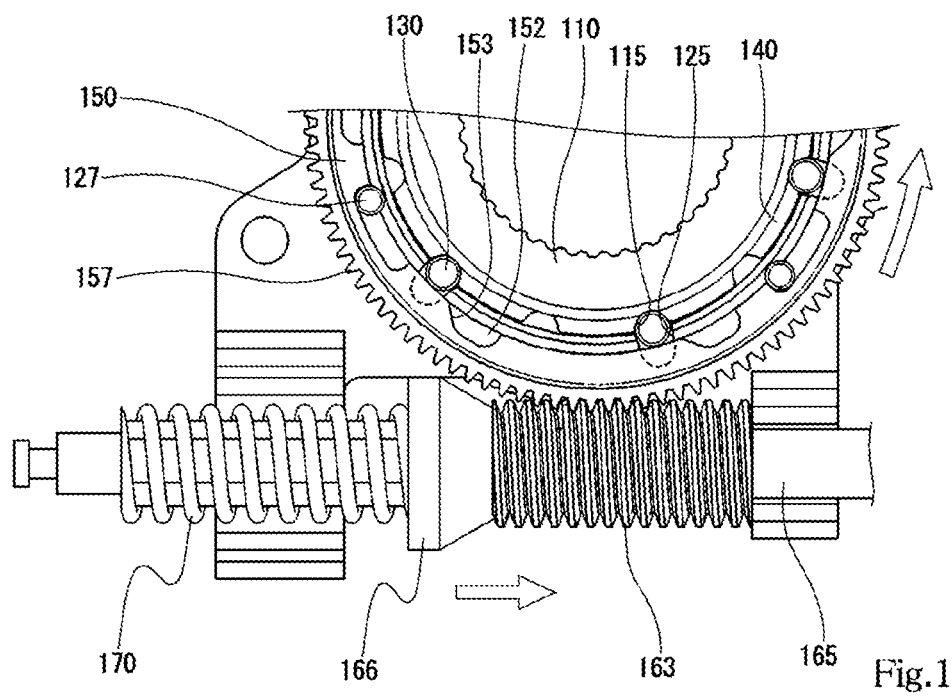
FIG. 10B is a schematic diagram of the selectable clutch shown in FIG. 8 when switched to the lock mode.

When the support grooves 115 and the pocket parts 125 come into alignment, the biasing force of the delay spring 170 is released, allowing the worm 163 and the spring receptacle 166 to move toward the free position as well as the selector 150 to rotate in the locking direction, as shown in FIG. 10B. The rollers 130 then move radially toward the support grooves 115 by the action of the guide surfaces 153 of the roller-receiving recesses 152. When the rollers 130 move into the support grooves 115, the roller-holding surface 116 of the support grooves 115 and the roller-holding surface 126 of the pocket parts 125 hold the rollers 130 in the circumferential direction, as well as the roller-holding surface 151 of the selector 150 makes contact with the rollers 130, and thus the inner race 110 and outer race 120 engage with each other.

To switch the selectable clutch from the lock mode to the free mode, the drive rod 165 is driven and rotated in the reverse direction to rotate the worm 163, to rotate the selector 150 in the unlocking direction. This moves the roller-holding surface 151 of the selector 150 away from the rollers 130. As a result, the rollers 130 receive both of the load toward the pocket parts 125, from the roller-holding surface 126 of the pocket parts 125 and the roller-holding surface 116 of the support grooves 115, and the biasing force of the resilient member 140. The rollers 130 thus separate from the support grooves 115, allowing the lock to be released.

While the delay spring is provided in the selector drive mechanism in the embodiments described above, the clutch mechanism may include the delay spring.

Figure 11:
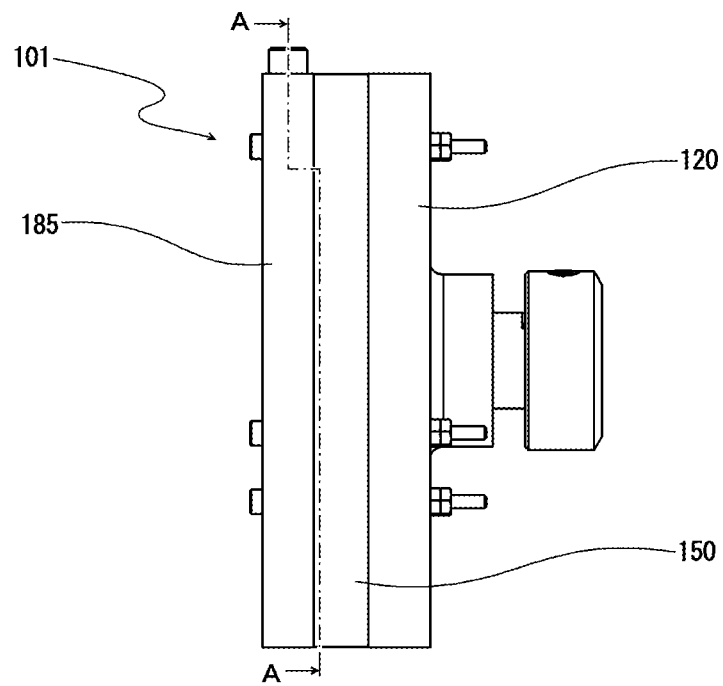
FIG. 11 is a side view illustrating the configuration of a clutch mechanism in yet another configuration example of the selectable clutch according to the present invention.
Figure 12:
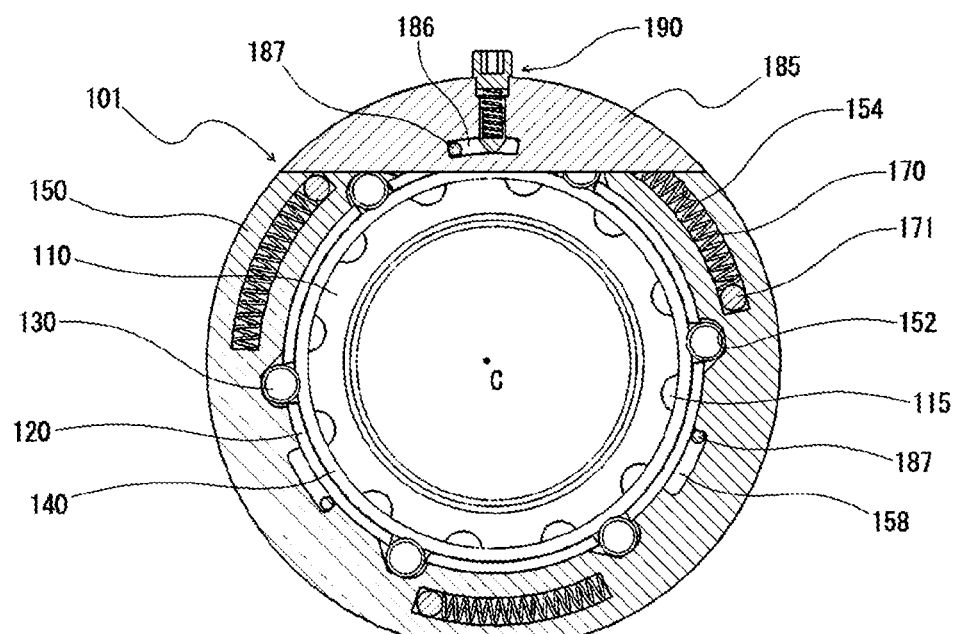
FIG. 12 is a combined cross section along the line A-A in FIG. 11.
Figure 13:
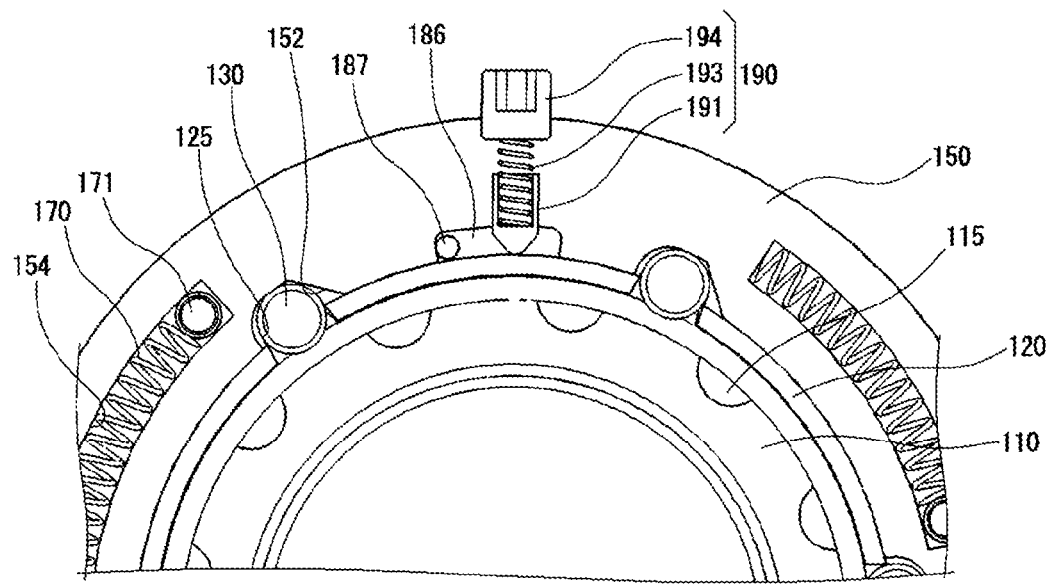
FIG. 13 is a schematic plan view illustrating a part of the clutch mechanism shown in FIG. 11.

The clutch mechanism 101 in the embodiment shown in FIG. 11 to FIG. 13 is configured with the outer race 120, selector 150, and a rotary plate 185 that forms a selector drive mechanism, aligned in this order adjacent each other in the axial direction. The clutch mechanism 101 basically has the same configuration as that of the embodiments described above. The same components as those of the embodiments described above are given the same reference numerals, and description thereof will be omitted.

The selector 150 has a plurality of circumferentially extending delay spring seat grooves 154 on one side, formed along a circle concentric to the rotation axis C. The delay spring seat grooves 154 are circumferentially arranged at predetermined intervals, at positions radially more outside than the roller-receiving recesses 152.

In each delay spring seat groove 154 are set a coiled delay spring 170, and a pin member 171 at one circumferential end (clockwise leading end in FIG. 11 and FIG. 12). The pin members 171 are fixed to the rotary plate 185.

The selector 150 has a plurality of circumferentially extending guide grooves 158 on one side. In each guide groove 158 is inserted a coupling pin member 187 that connects the rotary plate 185 and the outer race 120, such as to be slidable in the groove.

The rotary plate 185 is formed with circumferentially extending pin member slots 186 for the coupling pin members 187 to pass through and slide inside, corresponding to the guide grooves 158 of the selector 150. This clutch mechanism 101 is provided with a lock position retention mechanism 190 for keeping the selector 150 in the lock position when the selectable clutch is in the lock mode.

The lock position retention mechanism 190 includes a plunger 191 with a plunger bore that opens radially outward, a biasing means 193 accommodated in the plunger bore and biasing the plunger 191 radially inward, and a spring receptacle 194 fixed to an axial outer end of the biasing means 193.

The plunger 191 is slidably accommodated in a plunger housing hole that extends radially from one of the guide grooves 158 of the rotary plate 185 and opens in an outer circumferential surface of the rotary plate 185. With the spring receptacle 194 fixed to the rotary plate 185, the tip of the plunger is in contact with the circumferential surface on the radially inner side of the pin member slot 186. The tip of the plunger 191 exposed inside the pin member slot 186 is formed in a conical shape. When the selector 150 is rotated in the locking direction, the plunger 191, as it presses the coupling pin member 187, moves in the direction to compress the biasing means 193 by the action of the tapered surface.

Figure 14A:
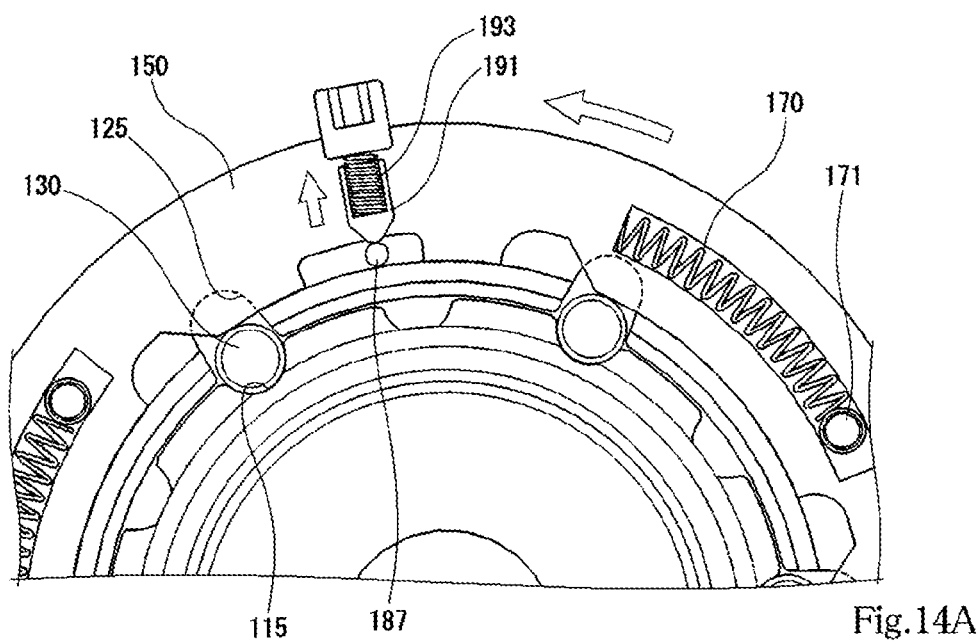
FIG. 14A is a schematic diagram illustrating a state of a lock position retention mechanism in which a plunger is activated.
Figure 14B:
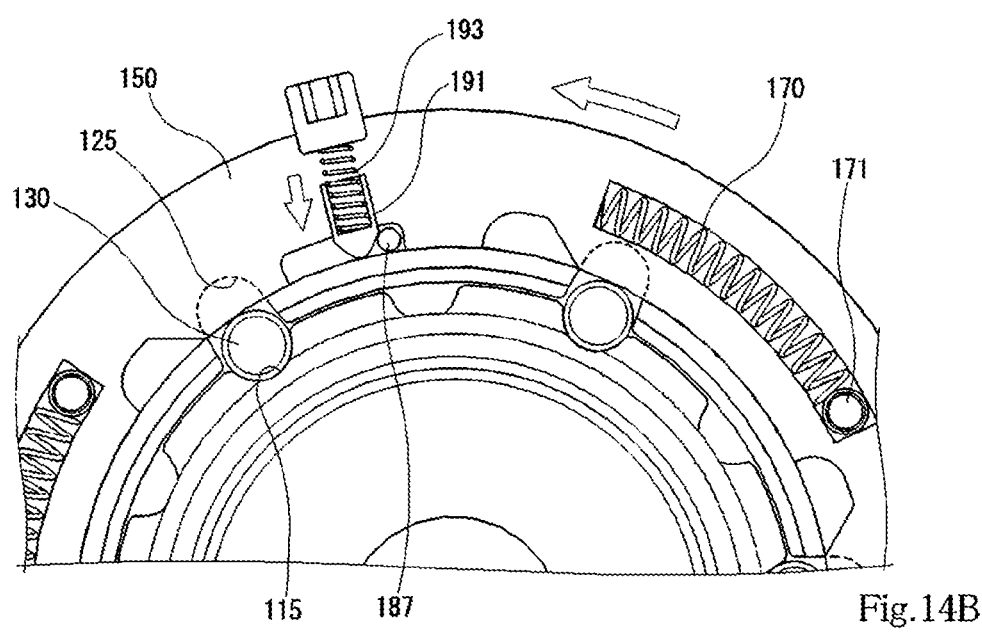
FIG. 14B is a schematic diagram illustrating a state in which the selectable clutch is held in the lock mode.

When the selectable clutch is held in the free mode, the plunger 191 is positioned on one side in the unlocking direction (clockwise in FIG. 13) of the coupling pin member 187, as shown in FIG. 13. When the support grooves 115 of the inner race 110 and the pocket parts 125 of the outer race 120 are in alignment and the selector 150 rotates in the locking direction, the plunger 191 moves radially outward such as to ride over the coupling pin member 187 as shown in FIG. 14A. After that, when the selectable clutch is switched to the lock mode, the plunger 191, having ridden over the coupling pin member 187, is moved over to the side in the locking direction (counterclockwise) of the coupling pin member 187, as shown in FIG. 14B. Thus, unintended rotation of the selector 150 in the unlocking direction, which may occur by vibration, for example, can be reliably prevented, so that the lock mode can be mechanically retained.

In this clutch mechanism 101, when the selector 150 is rotated in the locking direction in switching the selectable clutch from the free mode to the lock mode, the selector 150 is stopped from rotating when the support grooves 115 of the inner race 110 and the pocket parts 125 of the outer race 120 are out of alignment. Meanwhile, the pin members 171 press and compress the delay springs 170 as the rotary plate rotates, so that the selectable clutch keeps the lock wait state. As soon as the support grooves 115 of the inner race 110 and the pocket parts 125 of the outer race 120 come into alignment, the biasing force of the delay springs 170 is released, allowing the selector 150 to rotate in the locking direction. Thus the inner race 110 and the outer race 120 engage each other, with the rollers 130 held by the support grooves 115, pocket parts 125, and selector 150.

The selector drive mechanism may be of any type, i.e., any of the configurations with a linear or rotary actuator, or a worm gear, as those used as the selector drive mechanism in the selectable clutches according to the embodiments described above. Alternatively, any suitable gear mechanism may be used to directly drive or rotate the selector.

The selectable clutch may be provided with the lock position retention function by employing an actuator that has a position retention function in itself. In this case, the clutch mechanism need not be configured to include a lock position retention mechanism.

While embodiments of the present invention have been described above in detail, the present invention is not limited to the embodiments described above. Various design changes may be made without departing from the scope of the present invention set forth in the claims.

For example, while the outer race is fixed and the inner race is rotated in the configurations described in respective embodiments, other configurations are also possible, such as an outer race being rotated relative to a fixed inner race, or the inner race and outer race being both rotatable.

In the embodiments described above, the support grooves are formed in the outer circumferential surface of the inner race, while the pocket parts are formed in the inner circumferential surface of the outer race. The resilient member is set such as to bias the rollers radially outward. Instead, the support grooves may be formed in the inner circumferential surface of the outer race, the pocket parts may be formed in the outer circumferential surface of the inner race, and the resilient member may be set such as to bias the rollers radially inward.

In the embodiments described above, the resilient member is a common component shared by the plurality of rollers. Instead, a plurality of resilient members may be provided corresponding to respective rollers.

The selectable clutches in the embodiments described above are designed to be switchable between two operating modes, two-way free mode and two-way lock mode. The selectable clutch can also be designed switchable between three or four operating modes including one-way lock mode, by disposing pairs of rollers such as to be supported by respective pairs of adjacent support grooves, with first pocket parts and second pocket parts provided corresponding to each of the pairs of rollers. The selector in this case may be configured to be able to move one or both of the pairs of rollers in the radial direction.

The selectable clutch according to the present invention is significantly useful for building a vehicle parking lock system, for example. Namely, the selectable clutch according to the present invention, when locked, does not unlock unless the selector is operated to release the rollers from the hold. Even when torque is input due to the condition of the road on which the vehicle is parked or for some other reason, the clutch will not unlock so that the vehicle can be maintained at rest. On the other hand, the clutch allows itself to be unlocked when the selector is separated from the rollers. Therefore, the clutch can readily be unlocked even under a torque load, i.e., even with some torque being applied to the inner race or outer race, such as when the vehicle is parked on a slope.

What is claimed is:

1. A selectable clutch comprising: a cylindrical inner race and a cylindrical outer race that are coaxial and rotatable relative to each other; a plurality of rollers disposed between the inner race and the outer race; and a resilient member radially biasing the rollers, one of an outer circumferential surface of the inner race and an inner circumferential surface of the outer race being formed with pocket parts configured to accommodate the rollers and each having a roller-holding surface inclined relative to a circumferential direction, and another of the outer circumferential surface of the inner race and the inner circumferential surface of the outer race being formed with support grooves each having a roller-holding surface inclined relative to the circumferential direction, the resilient member being provided to bias the rollers toward the pocket parts, the selectable clutch further comprising a selector axially adjacent one of the inner race and the outer race that is provided with the pocket parts, the selector being disposed so as to be rotatable independently of the inner race and the outer race, the selector including a roller-holding surface that makes contact with the rollers in a state in which the rollers are supported by the support grooves, the selector being configured to allow switching between a free mode that allows relative rotation between the inner race and the outer race, and a lock mode that prohibits relative rotation between the inner race and the outer race, by moving the rollers radially, the roller-holding surface of each pocket part and the roller-holding surface of each support groove being formed with an inclination angle such that, when a roller is held therebetween, a force acts on the roller in a direction to cause the roller to move toward a corresponding pocket part, the selectable clutch being configured such that the rollers are held between roller-holding surfaces of the support grooves, roller-holding surfaces of the pocket parts, and the roller-holding surface of the selector in the lock mode.

2. The selectable clutch according to claim 1, wherein the pocket parts are formed on the inner circumferential surface of the outer race, and the support grooves are formed on the outer circumferential surface of the inner race.

3. The selectable clutch according to claim 1, wherein the selector includes roller-receiving recesses configured to be able to accommodate the rollers when the selectable clutch is in the free mode in which the rollers are accommodated in the pocket parts, and the roller-receiving recesses each have a guide surface configured to radially move the rollers toward the support grooves as the selector is rotated.

4. The selectable clutch according to claim 1, wherein an axially extending pin member is provided to one of the inner race and the outer race that is formed with the pocket parts, and the selector is provided with a rotation restriction groove for the pin member to be slidably inserted therein to restrict a movable range of the selector.

5. The selectable clutch according to claim 1, wherein the support grooves have an opening edge that is chamfered or rounded.

6. The selectable clutch according to claim 1, further comprising a delay spring disposed to be resiliently deformed in a compressed manner when the selector is rotated in a locking direction.

7. The selectable clutch according to claim 6, further comprising a selector drive mechanism that drives the selector to rotate independently of the inner race and the outer race, wherein the selector drive mechanism includes a drive rod coupled to the selector and able to reciprocate between a free position to switch the selectable clutch to the free mode and a lock position to switch the selectable clutch to the lock mode, and the delay spring is a coil spring, with the drive rod passing therethrough, the selectable clutch further comprising a position restriction part that restricts a movable range of the drive rod.

8. The selectable clutch according to claim 1, further comprising a lock position retention function for keeping the selector in a position when the selectable clutch is switched to the lock mode.

9. The selectable clutch according to claim 1, wherein the resilient member is a component shared by the plurality of rollers.

* * * * *